United States Patent [19]
Hartzell et al.

[11] Patent Number: 6,014,008
[45] Date of Patent: Jan. 11, 2000

[54] BATTERY IDENTIFICATION SYSTEM

[75] Inventors: Patrick D. Hartzell, Cary; Brian D. Miller, Durham; Tina M. Lee, Raleigh; John W. Northcutt, Chapel Hill; Fred P. Nading, Cary, all of N.C.

[73] Assignee: Ericsson, Inc., Research Triangle Park, N.C.

[21] Appl. No.: 09/012,122

[22] Filed: Jan. 22, 1998

[51] Int. Cl.[7] .................................................. H01M 10/46
[52] U.S. Cl. .................................................. 320/106
[58] Field of Search ................................ 320/106, 107, 320/110, 112, FOR 101, FOR 104, DIG. 12

[56] References Cited

U.S. PATENT DOCUMENTS

| | | |
|---|---|---|
| 5,164,652 | 11/1992 | Johnson et al. .......................... 320/106 |
| 5,237,257 | 8/1993 | Johnson et al. .......................... 320/106 |
| 5,510,690 | 4/1996 | Tanaka et al. ........................... 320/106 |
| 5,646,501 | 7/1997 | Fishman et al. ...................... 320/106 X |

*Primary Examiner*—Edward H. Tso
*Attorney, Agent, or Firm*—Rhodes, Coats & Bennett, LLP

[57] ABSTRACT

The present invention entails a battery identification system to be utilized by cellular telephones, battery chargers, and other electrical devices for identification of the battery types employed within such devices. The battery identification system comprises a battery type identification circuit that includes one or more input switches that are coupled to a voltage divider network that is made up of a series of voltage divider segments. Each voltage divider segment is designed to produce a signal that is indicative of the on/off state of a particular input switch. To actuate the input switches, the employed battery is provided with one or more switch actuators, where the position and spacing of the switch actuators on the battery in effect uniquely identifies the battery type. Various switching and actuating configurations are contemplated, including mechanical, galvanic, magnetic, and optical systems.

22 Claims, 5 Drawing Sheets

6,014,008

BATTERY IDENTIFICATION SYSTEM

FIELD OF THE INVENTION

The present invention relates to battery identification systems utilized by cellular telephones, battery chargers, and other electrical devices for the communication of battery specific information associated with the battery employed within such devices.

BACKGROUND OF THE INVENTION

Recent advances in re-chargeable battery technology have led to the development and manufacture of a multitude of battery pack designs, having a variety of specific recharging and operating characteristics. With regard to recharging, the design and utilization of a specific recharger unit for each battery type certainly simplifies the design requirements of the recharging unit. However, as the number of battery types continues to grow, so does the consumer demand for recharging units that are capable of effectively and efficiently recharging multiple battery types, where each battery type may possess a different charging profile or characteristic. The first and most obvious concern that emerges from the fact that one electrical device may employ a number of different battery types is the need, at any one time, to identify information related to the specific battery being employed by the electrical device.

With particular regard to the cellular telephone industry, it is not uncommon for cellular telephones to incorporate or act as an integral component of a battery recharging system. It is also not uncommon for such cellular phones to be designed so as to operate with or accept a variety of different battery types. As such, there is need for these cellular phones to be capable of quickly and easily identifying the specific battery type that happens to be employed at any given time. Battery identification systems have been devised for electrical devices and cellular telephones in the past. For example, see the disclosures found in U.S. Pat. Nos. 5,237,257 and 5,164,652.

However, the need remains for a practical, reliable, and easily manufacturable battery identification system that can be readily employed in modern cellular telephones, battery recharging equipment, and other electrical devices.

SUMMARY OF THE INVENTION

The present invention entails a battery identification system that can be employed in a cellular telephone, battery charger, or other electrical device. In one embodiment, the battery identification system comprises a battery type identification circuit that includes one or more input switches that are coupled to a voltage divider network that is made up of a series of voltage divider segments. Each voltage divider segment is designed to produce a coded signal that is a function of the on/off state of a particular input switch. To actuate the input switches, the employed battery is provided with one or more switch actuators. The position and spacing of the switch actuators on the battery in effect uniquely identify the type of the battery. Further, the provisioning and spacing of the switch actuators on the battery are designed to align with one or more of the input switches of the battery identification circuit. Thus by appropriately positioning the battery with respect to the identification circuit and the input switches thereon, certain switch actuators of the battery actuate one or more of the input switches of the battery identification circuit. This in turn actuates one or more of the voltage divider segments of the identification circuit, which produces a coded output signal that uniquely identifies the type of the battery employed.

A number of different battery type identification circuits are disclosed. Basically, these circuits are similar but include different types of input switches. Accordingly in the various embodiments disclosed herein, the input switches take the form of mechanical, magnetic and optical switches. In one embodiment, the input switches are effectively formed by mating electrical contacts formed on the battery itself and within the identification circuit.

DETAILED DESCRIPTION OF THE INVENTION

Figure 1:
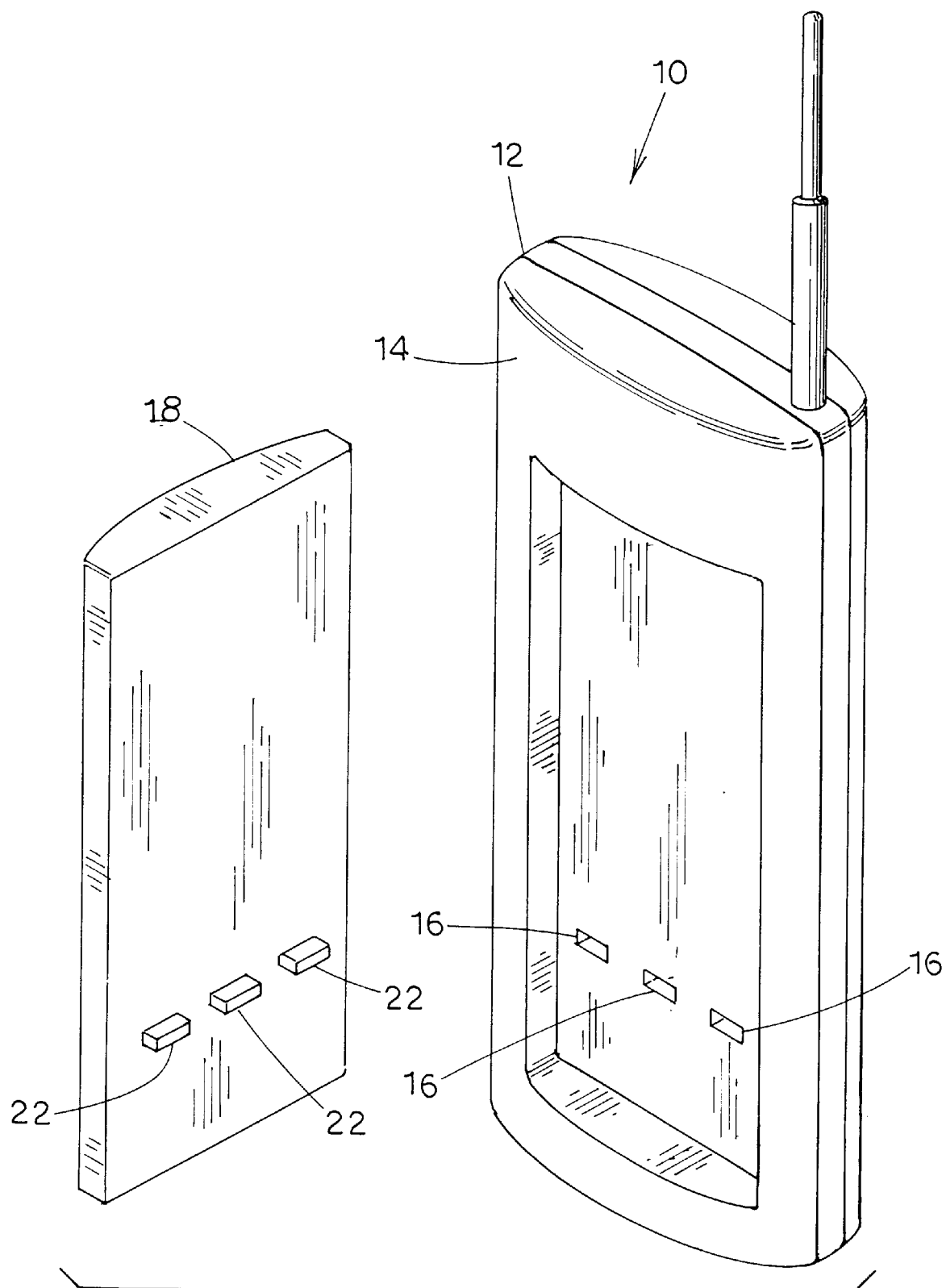
FIG. 1 is an exploded, perspective view of a typical cellular telephone which incorporates the battery identification system of the present invention.

Shown in FIG. 1 is a cellular telephone, indicated generally by the numeral 10, and an associated battery pack 18. Cellular telephone 10 includes a housing 12, having a back 14 which is adapted to receive and make electrical connection with the battery pack 18. Formed in the back 14 of the housing 12 are a series of switch apertures 16. Disposed generally about the battery pack 18 is a series of switch actuators 22, which are so aligned as to be received within the switch apertures 16 and generally actuate a corresponding series of input switches which are contained, at least in part, within the housing 12 of the cellular telephone 10. Depending generally on the number and/or relative positioning of the actuators and associated input switches, unique binary battery identification codes are produced within the cellular telephone in response to actuation of the input switch array by an attached battery pack. It should be appreciated that in addition to the identification of battery type information, the present invention could also be used to establish and communicate battery specific serial numbers, date codes, manufacturers, manufacturing locations and the like. Consequently, references to battery type identification made herein are meant to include and encompass the identification of any relevant information related to an associated battery.

Figure 2:
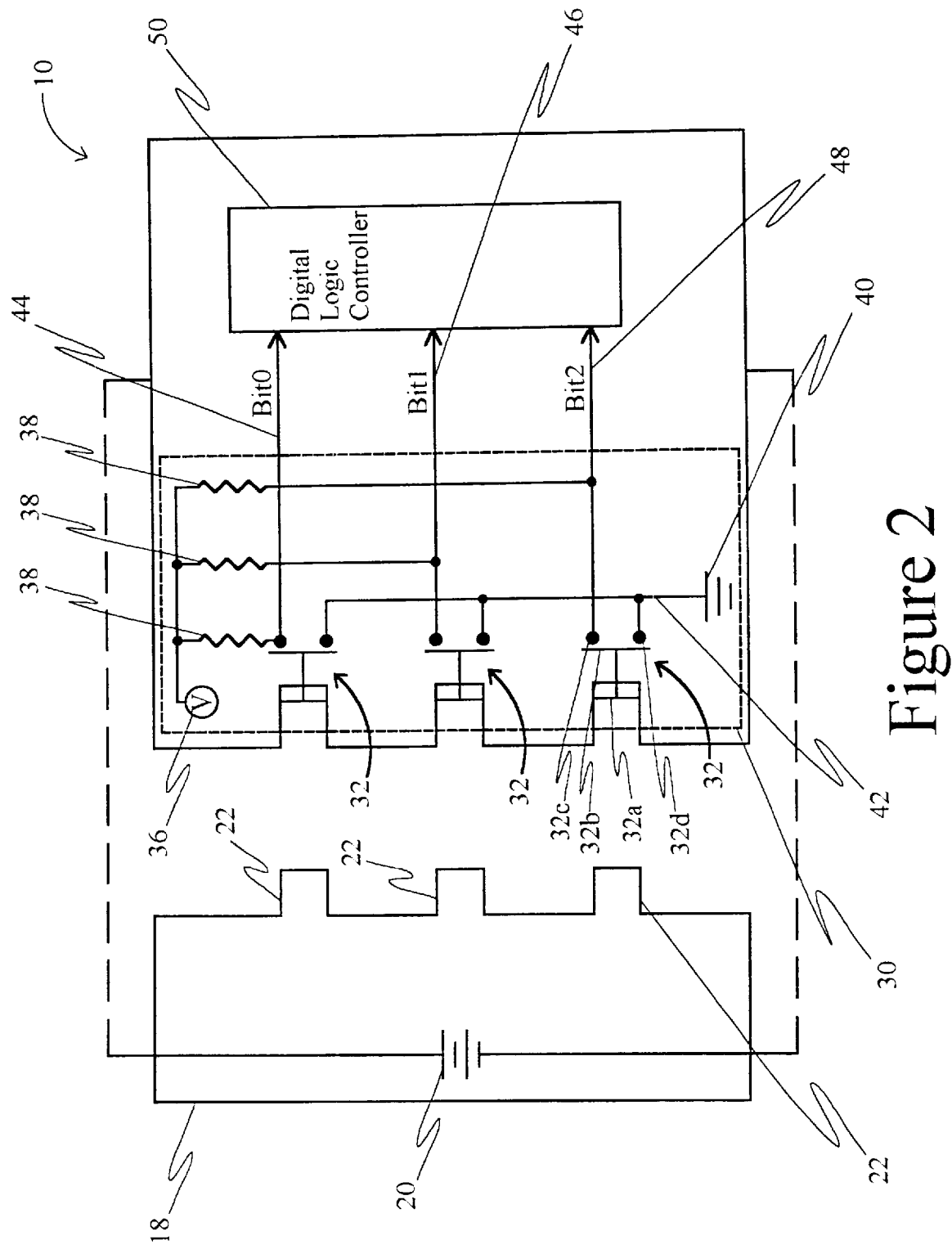
FIG. 2 is a schematic diagram of the battery identification system of the present invention illustrating an embodiment utilizing a series of mechanical switches.

A schematic diagram of a first embodiment of the battery identification system of the present invention is shown in FIG. 2, generally illustrating both the cellular telephone unit 10 and the associated battery pack 18. Battery pack 18 contains internally an electrochemical cell 20 which enables the battery to provide the associated cellular telephone 10 with the necessary electrical potentials or power required for normal operation. In the particular example of the embodiment shown in FIG. 2, battery pack 18 is configured so as to include a series of three protruding switch actuators 22, which are adapted to be received and engage a corresponding series of three input switches contained within the cellular telephone 10.

Contained within the cellular telephone 10 is a battery type identification circuit 30 which includes a series of three input switches, generally indicated by the numeral 32. Each input switch 32 is mechanical in nature, and comprises a plunger 32a which is mounted within the switch aperture 16, so as to be movable from a normally retracted, open position to an extended, closed position in response to actuation by the battery pack actuators 22. Rigidly coupled to the interior end of the plunger 32a is an electrically conductive contact 32b, which moves back and forth with the plunger 32a. Disposed immediately adjacent to the electrical contact 32b are a pair of electrical contact terminals 32c and 32d. As such, the switch components described above effectively form a normally open, mechanical momentary contact switch. It should be appreciated that, while the reference numerals designating switch components are shown only for the lower switch in FIG. 2, like components of the intermediate and upper switches can be referred to by the same reference numerals.

Battery type identification circuit 30 further includes a regulated voltage source 36, a reference voltage point 40, and three primary electrical resistors 38, which together with the input switches 32 effectively form a series of voltage divider networks. As illustrated in FIG. 2, one terminal of each of the primary resistors 38 is electrically connected to the regulated voltage source 36, while the remaining terminal of each primary resistor 38 is electrically connected to the upper terminal 32c of a corresponding input switch 32. Furthermore, each of the upper terminals 32c is electrically connected to a separate output signal line. Of the three output signal lines, line 44 is connected to the upper input switch, line 46 is connected to the intermediate input switch, and line 48 is connected to the lower input switch. The remaining lower terminal 32d of each switch 32 is electrically connected, via reference voltage line 42, to the reference voltage point 40.

Connected to the output of the battery type identification circuit 30 described above is a digital logic controller 50. Logic controller 50 is adapted to receive a three bit, binary input code from the identification circuit 30 via the output signal lines 44, 46, and 48. As shown in FIG. 2, the logic controller 50 is configured so as to interpret signal line 44 as providing bit 0, line 46 as providing bit 1, and line 48 as providing bit 2.

Application or actuation of the battery identification system as shown in FIGS. 1 and 2 is initiated through a coupling or snapping on of the battery pack 18 to the rear face 14 of the cellular telephone 10. As the battery pack 18 engages the cellular telephone 10, switch actuators 22 formed on the surface of the battery pack align with and are inserted into the switch apertures 16 formed in the cellular telephone housing 12. It will be appreciated from the schematic diagram of FIG. 2 that as an actuator 22 proceeds inward and through the apertures 16, the tip of the actuator will eventually engage the switch 32 and force the switch plunger 32a to extend generally towards the adjacent terminals 32c and 32d. As the plunger 32a is extends towards the terminals 32c and 32d, the associated electrical contact 32b is ultimately urged into direct contact with both switch terminals 32c and 32d. By contacting both switch terminals 32c and 32d, the contact 32b effectively shorts or electrically connects the two terminals together.

With regard to operation of the voltage divider networks, it will be appreciated that when a switch 32 is in the open position, that is the contact 32b is not shorting the two switch terminals 32c and 32d together, the output signal present at the upper switch terminal 32c will have a voltage equal to the regulated voltage. Conversely, when a switch 32 is in the closed position, that is the contact 32b is shorting the two switch terminals 32c and 32d together, the output signal present at the upper switch terminal 32c will have a voltage equal to the voltage of the reference voltage, as the upper terminal 32c will necessarily be in direct electrical contact with the reference voltage point 40. In a contemplated embodiment, the reference voltage is taken to be ground, that is 0.0 volts. Therefore, a closed switch 32 will result in the appearance of 0.0 volts at the upper switch terminal 32c and consequently on the associated output signal line. If the regulated voltage source 36, for example, was assumed to provide a +5.0 volt potential, then an open switch 32 would result in the appearance of +5.0 volts at the upper switch terminal 32c and consequently on the associated output signal line. Given this previous discussion and the assumption that an output signal of +5.0 volts represents a binary 1, while an output signal of 0.0 volts represents a binary 0, it should become apparent that the binary code produced by the battery pack 18 shown in FIG. 2 would be 000. That is, with the upper input switch 32 forced closed by the upper battery pack actuator 22, the associated output signal line 44 and necessarily the Bit0 input to the logic controller 50 would be at a 0.0 intermediate input switch 32 forced closed by the intermediate battery pack actuator 22, the associated output signal line 46 and necessarily the Bit1 input to the logic controller 50 would be at a 0.0 volt level. With the lower input switch 32 forced closed by the lower battery pack actuator 22, the associated output signal line 48 and necessarily the Bit2 input to the logic controller 50 would be at a 0.0 volt level, hence the code value 000.

From the description and discussion presented above, it becomes apparent that the battery type identification circuit 30 shown in FIG. 2 essentially produces a three bit, binary code in response to actuation of the input switches 32 by an attached battery pack 18. As there are three individual input switches 32, the code produced is three bits in length, while the dual position nature of the switches 32 is responsible for the binary nature of the code. Therefore, further consideration of such an architecture reveals that a three bit, binary code is capable of representing eight unique states or, in this application, eight unique battery types. For example, if a unique battery pack did not have the upper actuator but did have the intermediate and lower actuators, the resulting binary code would be 100. Differing numbers of battery types could obviously be accommodated by either varying the number of bits in the code or varying the number of allowable values that each bit can assume.

With regard to the primary resistors 38, the value of these resistors is somewhat arbitrary, in that from the previous discussion it was shown that they have no appreciable impact on the voltage levels developed on the output signal lines 44, 46, and 48. These resistors do, however, have an impact on overall power consumption of the cellular telephone, in that when a switch 32 is closed a circuit will necessarily be completed between the regulated voltage source 36 and the reference voltage or ground point 40. When this circuit is completed, electric current will flow generally from the regulated voltage source 36, through the primary resistor 38, and into the ground point 40. Those skilled in the art will appreciate that, as such, power will be wasted or dissipated in the primary resistor 38 and appear as heat. Therefore, the values of the primary resistors 38 will typically be chosen so as to minimize power dissipation, while meeting all other circuit operating requirements. Furthermore, as these resistor values are somewhat arbitrary, they may also be chosen such that all primary resistors 38 have the same value, thus minimizing manufacturing complications.

Figure 3:
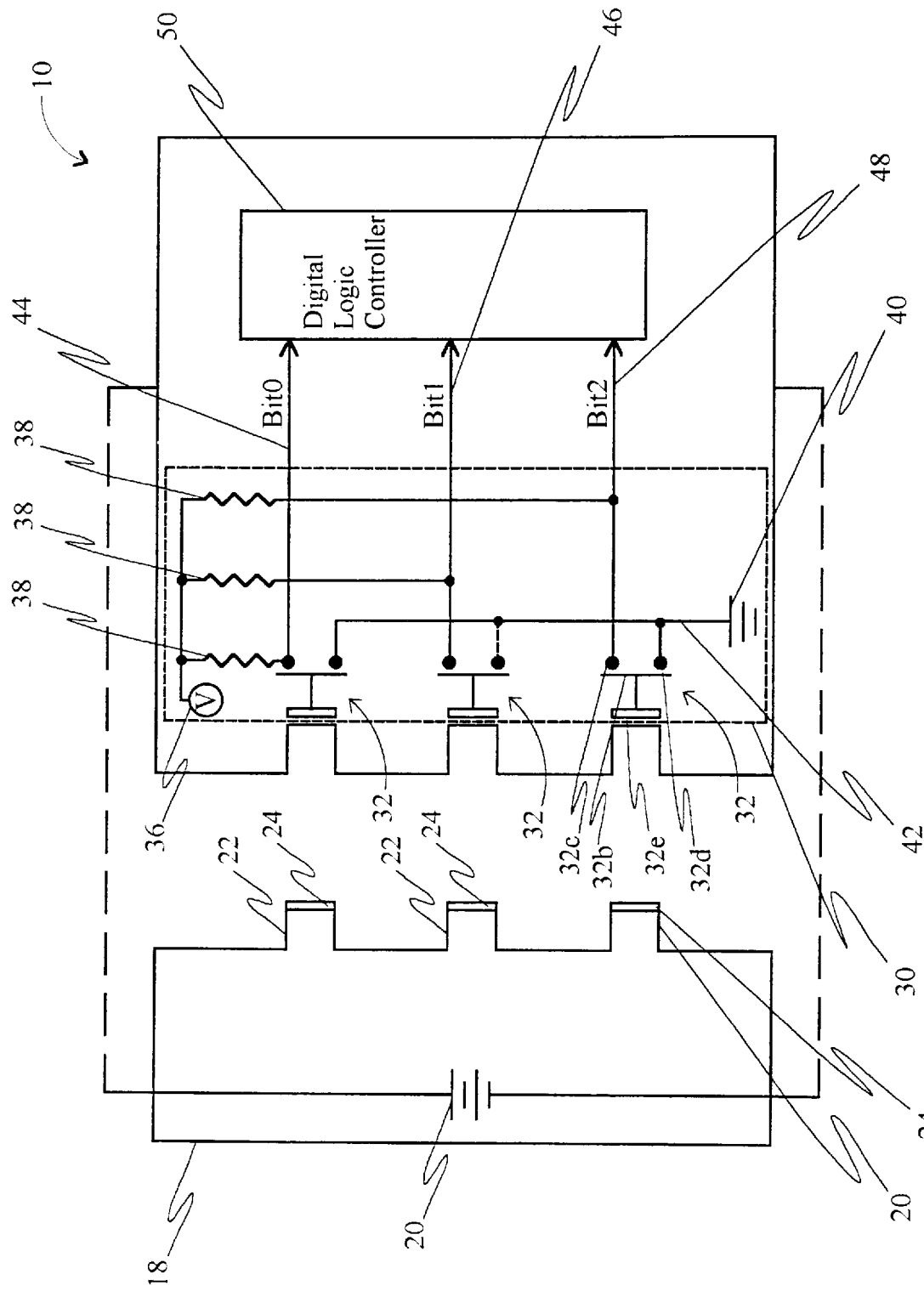
FIG. 3 is a schematic diagram of the battery identification system of the present invention illustrating an embodiment utilizing a series of magnetic switches.

FIG. 3 illustrates a second, alternate embodiment of the battery identification system of the present invention. In this embodiment, the mechanical input switches previously described and shown in FIG. 2 are modified to include magnetic elements which facilitate contact free actuation of the input switches. As can be seen in FIG. 3, the conventional plunger 32a of the previously described input switch has been replaced by a functionally similar magnetic plunger 32e. As with plunger 32a, an electrically conductive contact 32b is rigidly coupled to the interior end of the magnetic plunger 32e and moves back and forth with the plunger 32e. Disposed immediately adjacent the electrical contact 32b are a pair of electrical contact terminals 32c and 32d. As such, the switch components described above effectively form a normally open, magneto-mechanical momentary contact switch, wherein the plunger 32e is actuated by the close proximity of a suitably magnetized actuator. In all other respects, the magneto-mechanical switch described herein provides the same functionality as the mechanical momentary contact switch described in the first embodiment of FIG. 2. It should be appreciated that, while the reference numerals designating switch components are shown only for the lower switch in FIG. 3, like components of the intermediate and upper switches can be referred to by the same reference numerals. It should also be appreciated that a variety of switches employing different magnetic actuation technologies could be employed just as readily as the magneto-mechanical switch described below. More particularly, magnetically actuated reed or Hall effect switches could also be employed to serve in a similar manner.

Furthermore, in the embodiment shown in FIG. 3, switch actuators 22 disposed about the battery pack 18 include magnetic material 24 formed in their tips. In both the case of the magnetic switch plunger 32e and the magnetic actuator tip 24, the required magnetic properties of these components could be provided by materials which exhibit either permanent magnetic or electromagnetic properties. Furthermore, in the case of the embodiment shown in FIG. 3, the magnetic actuator tip 24 and corresponding magnetic plunger 32e would typically be designed such that the two magnetic components repel one another when they are brought into close proximity.

As with the first embodiment described, application or actuation of the battery identification system shown in FIGS. 1 and 3 is initiated through a coupling or snapping on of the battery pack 18 to rear face 14 of the cellular telephone 10. As the battery pack 18 engages the cellular telephone 10, switch actuators 22 formed on the surface of the battery pack align with and are inserted into the switch apertures 16 formed in the cellular telephone housing 12. In this case, it will be appreciated from the schematic diagram of FIG. 3 that as an actuator 22 proceeds inward and through the apertures 16, the magnetic tip 24 of the actuator will eventually move to within a close proximity of the switch 32 and, by the relative orientation of the respective magnetic fields associated with each component, force the magnetic switch plunger 32e to extend generally towards the switch terminals 32c and 32d. As the magnetic plunger 32e is displaced towards the terminals 32c and 32d, the associated electrical contact 32b is ultimately urged into direct contact with both terminals 32c and 32d. By contacting both switch terminals 32c and 32d, the contact 32b effectively shorts or electrically connects the two terminals together, and thus completes the circuit connection to ground 40. It is significant, and should be appreciated that with the use of a magnetic switch plunger 32e and a magnetic actuator tip 24, direct physical contact of the plunger and actuator is not required for operation of the switch and hence, operation of the battery identification system of the present invention.

Furthermore, although the battery pack actuators 22 assume the form of raised protrusions in the example shown in FIG. 3 and the switches 32 are effectively recessed within the cellular telephone housing 12, flush mounted actuators and input switches could also be effectively employed to achieve the same function.

As can be seen from a comparison of FIGS. 2 and 3, with the exception of the input switch designs, the balance of the respective battery type identification circuits 30 are identical. Consequently, the operational aspects of the circuit 30 shown in FIG. 3 are identical to those previously described for the first embodiment, and hence will not be repeated in detail.

It is assumed in the following discussion that the regulated voltage source 36 is configured to provide +5.0 volts and furthermore it is also assumed that an output signal with an amplitude of approximately +5.0 volts is interpreted to be a binary 1 by the logic controller 50, while an output signal of approximately 0.0 volts is interpreted as a binary 0 by the controller 50. Given this previous discussion, it should become apparent that the binary code produced by the battery pack 18 shown in FIG. 3 would be 000. That is, with the upper magnetic input switch 32 repelled inward and forced closed by the upper battery pack magnetic actuator tip 24, the associated output signal line 44 and necessarily the Bit0 input to the logic controller 50 would be at a 0.0 volt level. With the intermediate magnetic input switch 32 repelled and forced closed by the intermediate battery pack magnetic actuator tip 24, the associated output signal line 46 and necessarily the Bit1 input to the logic controller 50 would be at a 0.0 volt level. With the lower magnetic input switch 32 repelled and forced closed by the lower battery pack magnetic actuator tip 24, the associated output signal line 48 and necessarily the Bit2 input to the logic controller 50 would be at a 0.0 volt level, hence the code value 000.

From the description and discussion presented above, it becomes apparent that the battery type identification circuit 30 shown in FIG. 3 also produces a three bit, binary code in response to actuation of the magnetic input switches 32 by an attached battery pack 18. As there are three individual magnetic input switches 32, the code produced is three bits in length, while the dual position nature of the magnetic switches 32 is responsible for the binary nature of the code. As was the case with the first embodiment discussed, further consideration of such an architecture reveals that a three bit, binary code is capable of representing eight unique states or, in this application, eight unique battery types. Differing numbers of battery types could obviously be accommodated by either varying the number of bits in the code or varying the number of allowable values that each bit can assume.

Figure 4:
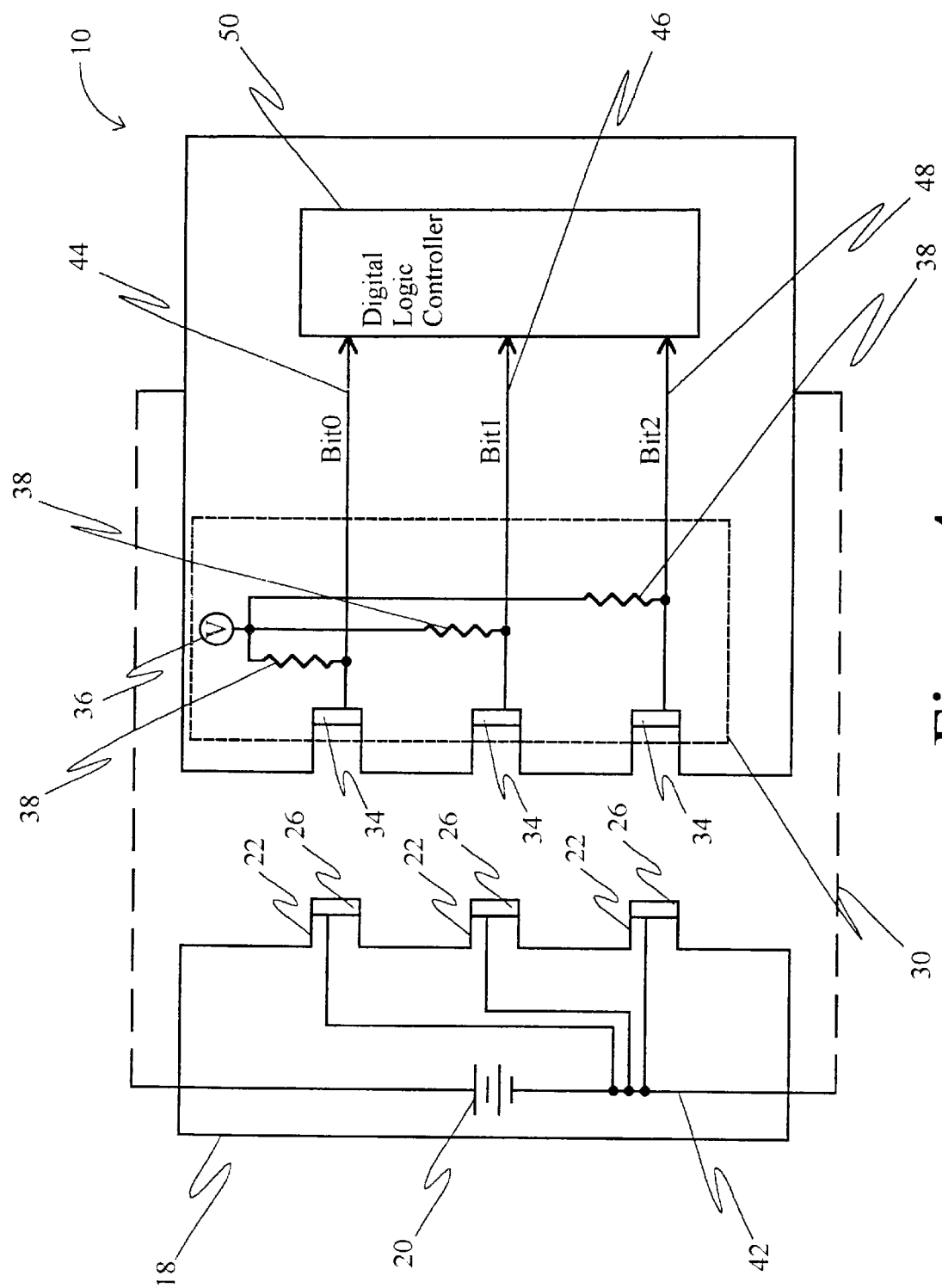
FIG. 4 is a schematic diagram of the battery identification system of the present invention illustrating an embodiment utilizing a series of galvanic contacts.

FIG. 4 illustrates a third, alternate embodiment of the battery identification system of the present invention. In this embodiment, the mechanical input switches previously described are replaced with a series of galvanic or conductive contact pads 34. Each conductive contact pad 34 effectively comprises one half of a contact switch, wherein the second half of the switch is effectively formed by a corresponding galvanic or conductive contact pad 26 which is disposed generally about the tip of the battery pack actuator 22. As with the embodiments previously described, application or actuation of the battery identification system shown in FIGS. 1 and 4 is initiated through a coupling or snapping on of the battery pack 18 to the rear face 14 of the cellular telephone 10. As the battery pack 18 engages the cellular telephone 10, switch actuators 22 formed on the surface of the battery pack align with and are inserted into the switch apertures 16 formed in the cellular telephone housing 12. In this case, it will be appreciated from the schematic diagram of FIG. 4 that as an actuator 22 proceeds inward and through the apertures 16, the conductive tip 26 of the actuator will eventually engage and make electrical contact with the corresponding conductive pad 34 disposed in the cellular telephone 10.

With regard to the battery type identification circuit 30, it will be appreciated that the circuit 30 utilized in the particular embodiment illustrated in FIG. 4 differs slightly in appearance, but not in function from the previous embodiments discussed. In the previous embodiments described herein, and illustrated in FIGS. 2 and 3, closure of the input switch effectively resulted in connection of the associated output signal line to a reference voltage point. In both of these embodiments, the reference voltage point was contained internal to the body of the cellular telephone 10. However, in the embodiment currently being considered, connection to the reference voltage point is made in a slightly different manner. As shown in FIG. 4, upon closure of the effective input switch, that is, contact of conductive pad pair 34 and 26, connection to the reference voltage point is made internally within the battery pack 18. Furthermore, in this embodiment the reference voltage point is taken as the negative terminal of the electrochemical cell 20. It will be appreciated by those skilled in the art, that the galvanic contacts could easily be designed so as to facilitate connection to a reference voltage point located within the body of the cellular telephone 10, as both the positive and negative terminals of the electrochemical cell 20 are typically connected to the phone when the battery pack 18 is operatively attached.

With exception of the method of contact and the physical routing of the reference voltage connection, the battery type identification circuit 30 shown in FIG. 4 operates on the same electrical principles as described and discussed for the previous embodiments, and therefore the operational aspects of the circuit 30 will not be discussed in further detail.

Furthermore, as was previously stated with regard to the magnetically actuated embodiment, although the battery pack actuators 22 assume the form of raised protrusions in the example shown in FIG. 4, and the conductive pads 34 are effectively recessed within the cellular telephone housing 12, the use of a conductive contact actuating means such as disclosed herein, also facilitates flush mounted conductive pad actuating system designs which perform in the same manner as the specific conductive pad actuating system shown in FIG. 4.

It is assumed in the following discussion that the regulated voltage source 36 is configured to provide +5.0 volts and furthermore it is also assumed that an output signal with an amplitude of approximately +5.0 volts is interpreted to be a binary 1 by the logic controller 50, while an output signal of approximately 0.0 volts is interpreted as a binary 0 by the controller 50. Given these assumptions and the previous discussion of circuit 30 operation, it should become apparent that the binary code produced by the battery pack 18 shown in FIG. 4 would be 000. That is, with the upper conductive pad 34 engaged and in electrical contact with the upper battery pack conductive actuator tip 26, the associated output signal line 44 and necessarily the Bit0 input to the logic controller 50 would be at a 0.0 volt level. With the intermediate conductive pad 34 engaged and in electrical contact with the intermediate battery pack conductive actuator tip 26, the associated output signal line 46 and necessarily the Bit1 input to the logic controller 50 would be at a 0.0 volt level. With the lower conductive pad 34 engaged and in electrical contact with the lower battery pack conductive actuator tip 26, the associated output signal line 48 and necessarily the Bit2 input to the logic controller 50 would be at a 0.0 volt level, hence the code value 000.

From the description and discussion presented above, it becomes apparent that the battery type identification circuit 30 shown in FIG. 4 also produces a three bit, binary code in response to actuation or electrical engagement of the conductive pads 34 by an attached battery pack 18 and the conductive pads 26 associated therewith. As there are three individual pairs of conductive pads 34 and 26, the code produced is three bits in length, while the dual position nature of relevant conductive pad pair 34 and 26 orientations, that is, contact or no contact, is responsible for the binary nature of the code. As was the case with the previous embodiments discussed, further consideration of such an architecture reveals that a three bit, binary code is capable of representing eight unique states or, in this application, eight unique battery types. Differing numbers of battery types could obviously be accommodated by either varying the number of bits in the code or varying the number of allowable values that each bit can assume.

Figure 5:
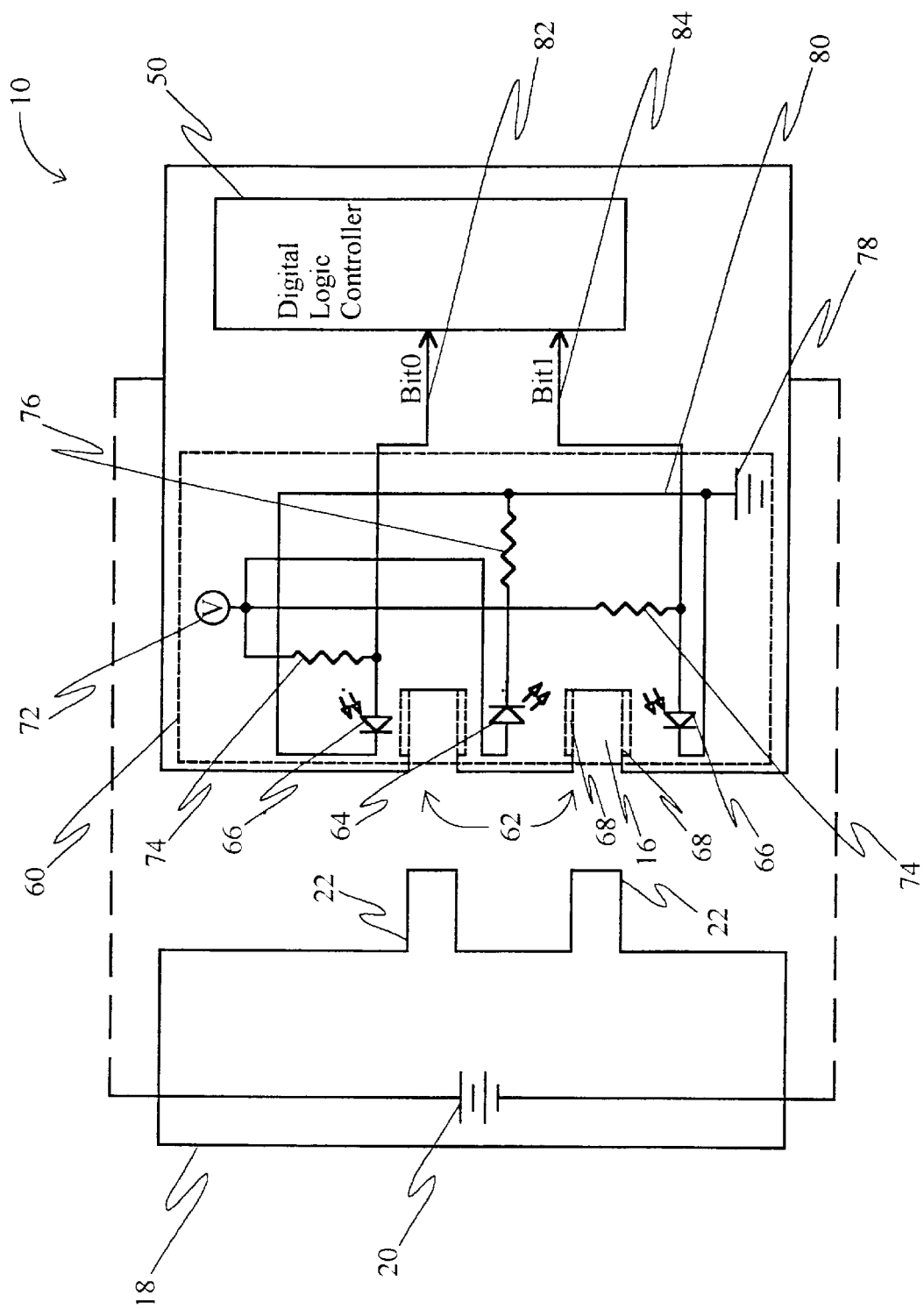
FIG. 5 is a schematic diagram of the battery identification system of the present invention illustrating an embodiment utilizing a series of optical switches.

FIG. 5 illustrates a fourth, alternate embodiment of the battery identification system of the present invention. In this embodiment, the mechanical input switches or conductive contact pads previously described are replaced with a series of optically actuated input switches, generally indicated by the numeral 62. Each optical switch 62 is comprised of a photo-detecting diode 66, a pair of generally transparent windows 68, and a photo-emitting diode 64. While such optical systems may use any wavelength of light, the most common usage would likely be light in the infrared spectrum. As illustrated in FIG. 5, the photo-detecting diode 66 is disposed adjacent the photo-emitting diode 68, wherein the two components are separated from one another by an air gap contained within the aperture 16. A line-of-sight optical transmission path is established between the emitting and detecting diodes, 68 and 66 respectively, and extends across the aperture air gap through the incorporation of the generally transparent windows 68 into the side walls of the aperture 16. As such, light is allowed to travel a path leading from the emitting diode 68 through the transparent window 68 adjacent the diode 68, through the air gap formed by the aperture 16, through the transparent window 68 adjacent the detecting diode 66, and onto the active sensing region of the detecting diode 66. It should be appreciated that, while the reference numerals designating switch components are shown only for the lower switch in FIG. 5, like components of the upper switch can be referred to by the same reference numerals.

The battery type identification circuit 60, of which the optical switches 62 are integral components, further contains a pair of primary resistors 74 and an emitting diode resistor 76. As with the previously described embodiments, a regulated voltage source 72 and a reference voltage or ground point 78 are also included in the circuit 60. In the embodiment shown in FIG. 5, one terminal of each primary resistor 74 is electrically connected to the regulated voltage source 72, while the remaining terminal is connected to the anode of a respective photo-detecting diode 66. Furthermore, output signal lines 82 and 84 are also electrically connected to the anodes of the two photo-detecting diodes 66 shown in FIG. 5. The cathode of each photo-detecting diode 66 is in turn connected to the ground point 78. With regard to the emitting diode resistor 76, one terminal is connected to the ground point 78, while the remaining terminal is connected to the cathode of the photo-emitting diode 64. The anode of the diode 64 is then connected directly to the regulated voltage source 72.

With exception of the battery type identification circuit 60, the balance of the battery identification system is structurally and operationally equivalent to the first embodiment described and discussed in detail above. Therefore, only the specific operation of the circuit 60 with respect to the embodiment shown in FIG. 5 will be discussed herein.

As such, it will be appreciated by those skilled in the art that while the general appearance of the battery identification circuit 60 differs from previously described battery identification circuits, the function is substantially the same. That function being to generate a binary signal in response to the making or breaking of an input switch, which in this case is the optical switch 62. Without going into great detail regarding the operational theory and operating characteristics of photo-detecting and photo-emitting diodes, it should be appreciated that in the simplest of terms, the photo-detecting diode 66 effectively behaves as a closed switch when light strikes an active or light sensitive area of the device. That is, the diode 66 becomes a very good conductor in the presence of light. However, in the absence of light, the diode 66 becomes a very poor conductor and hence, effectively behaves as an open switch. The photo-emitting diode 64, on the other hand, is designed so as to continuously emit light of a particular wavelength in response to a biasing voltage supplied by the regulated voltage source 72.

Application or actuation of the battery identification system shown in FIG. 5 is initiated through a coupling or snapping on of the battery pack 18 to the rear face 14 of the cellular telephone 10. As the battery pack 18 engages the cellular telephone 10, switch actuators 22 formed on the surface of the battery pack align with and are inserted into the switch apertures 16 formed in the cellular telephone housing 12. In this case, it will be appreciated from the schematic diagram of FIG. 5 that prior to insertion of the actuators, a line-of-sight optical transmission path exists between the emitting and detecting diodes, 64 and 66 respectively. As such, light emitted by the diode 64 continuously strikes the photo-detecting diode 66, causing the diode 66 to conduct and behave as a closed switch. As such, the output signal lines 82 and 84 associated with the pair of optical switches 62 are both effectively connected directly to the ground point 78. Hence, a voltage of 0.0 volts would initially appear on both signal lines 82 and 84.

As an actuator 22 proceeds inward and through the aperture 16, the actuator 22 will eventually be positioned so as to completely block the line-of-sight optical transmission path between the photo-emitting diode 64 and the respective photo-detecting diode 66. In doing such, the light being continuously emitted from the diode 64 is no longer able to travel across the aperture air gap and strike the adjacently disposed photo-detecting diode 66. Consequently, this absence of light causes the diode 66 to become a very poor conductor and behave as an open switch. As such, the output signal lines 82 and 84 associated with the pair of optical switches 62 are both effectively connected to the regulated voltage source 72 via the interposed primary resistors 74. As there is no appreciable current flow through this circuit, there will be no appreciable voltage drop across the primary resistors 74, and hence, a voltage approximately equal to the regulated voltage would appear on both signal lines 82 and 84.

It is assumed in the following discussion that the regulated voltage source 72 is configured to provide +5.0 volts and furthermore it is also assumed that an output signal with an amplitude of approximately +5.0 volts is interpreted to be a binary 1 by the logic controller 50, while an output signal of approximately 0.0 volts is interpreted as a binary 0 by the controller 50. Given these assumptions and the previous discussion of circuit 30 operation, it should become apparent that the binary code produced by the battery pack 18 shown in FIG. 5 would be 11. That is, with the upper optical switch 62 engaged by the upper battery pack actuator 22, the associated output signal line 82 and necessarily the Bit0 input to the logic controller 50 would be at a +5.0 volt level. With the lower optical switch 62 engaged by the lower battery pack actuator 22, the associated output signal line 84 and necessarily the Bit1 input to the logic controller 50 would be at a +5.0 volt level.

From the description and discussion presented above, it becomes apparent that the battery type identification circuit 60 shown in FIG. 5 produces a two bit, binary code in response to actuation or electrical engagement of the optical switches 62 by an attached battery pack 18 and the actuators 22 associated therewith. As there are two individual optical input switches 62, the code produced is two bits in length, while the dual state nature of the optical switches 62 is responsible for the binary nature of the code. Further consideration of such an architecture reveals that a two bit, binary code is capable of representing four unique states or, in this application, four unique battery types. Differing numbers of battery types could obviously be accommodated by either varying the number of bits in the code or varying the number of allowable values that each bit can assume.

It should be appreciated that with all four of the embodiments disclosed herein, it would likely be more attractive from a manufacturing standpoint to simply vary the number of bits in the code, that is, by varying the number of actuators and corresponding input switches. If, for example, sixteen battery types needed to be identified, it would be possible to represent all sixteen types with a four bit, binary code, through the use of four switch actuators and four input switches.

The present invention may, of course, be carried out in other specific ways than those herein set forth without parting from the spirit and essential characteristics of the invention. The present embodiments are, therefore, to be considered in all respects as illustrative and not restrictive, and all changes coming within the meaning and equivalency range of the appended claims are intended to be embraced therein.

What is claimed is:

1. A battery type identification system adapted to work in conjunction with a battery having one or more switch actuators associated therewith, comprising:
   a) a battery type identification circuit adapted to mate with the one or more switch actuators associated with the battery for determining the type of battery and providing a coded output signal that is indicative of the battery type;
   b) the battery type identification circuit including:
      (i) one or more input switches adapted to mate with the one or more switch actuators associated with the battery;
      (ii) a voltage divider network connected between a regulated voltage supply and a reference voltage;

(iii) the voltage divider network operatively connected to at least one input switch and including a primary resistor connected in series between the input switch and the regulated voltage; and (iv) wherein the battery type identification circuit produces an output signal that is a function of the one or more switch actuators associated with the battery and which identifies the type of the battery.

2. The battery type identification system of claim 1 including a logic controller associated with the voltage divider network for receiving the coded output signal produced by the battery type identification circuit.

3. The battery type identification system of claim 1 wherein the battery type identification circuit includes a series of spaced-apart input switches adapted to mate with selected switch actuators associated with the battery; and wherein the voltage divider network includes a plurality of individual voltage divider segments with each voltage divider segment connected to a respective input switch and including a primary resistor connected between the regulated voltage supply and the reference voltage.

4. The battery type identification system of claim 3 wherein the identification circuit includes a series of output signal lines connected to the respective voltage divider segments, each output signal line adapted to transmit a signal produced by a respective voltage divider segment.

5. The battery type identification system of claim 4 wherein the respective voltage divider segments collectively produce a binary code signal that is a function of a voltage value at a point between the reference voltage and the regulated voltage.

6. The battery type identification system of claim 4 including a logic controller coupled to the output signal lines extending from the respective voltage divider segments and wherein the logic controller is adapted to interpret the output signals received.

7. The battery type identification system of claim 1 wherein the battery having the one or more switch actuators forms a part of the battery type identification system.

8. The battery type identification system of claim 1 wherein the input switches of the identification circuit includes at least one mechanical switch that is moveable between open and closed positions.

9. The battery identification system of claim 1 wherein the one or more input switches of the identification circuit includes a galvanic contact that is adapted to mate with the one or more switch actuators associated with the battery.

10. The battery identification system of claim 1 wherein the one or more input switches of the identification circuit includes at least one magnetic switch that is adapted to be actuated by one of the switch actuators associated with the battery.

11. The battery identification system of claim 1 wherein the at least one input switch of the identification circuit includes at least one optical switch that is adapted to be actuated by one of the switch actuators associated with the battery.

12. The battery type identification system of claim 7 wherein the battery includes a main body having at least one protrusion extending therefrom and wherein the protrusion forms a switch actuator.

13. The battery type identification system of claim 7 wherein the position of the one or more switch actuators on the battery at least partially uniquely identifies the type of the battery.

14. The battery type identification system of claim 7 wherein the battery includes a series of spaced apart protrusion that form a series of spaced apart switch actuators, and wherein the spacing of the switch actuators uniquely identifies the type of the battery.

15. The battery type identification system of claim 14 wherein the switch actuators associated with the battery are operative to actuate the one or more input switches of the identification circuit which in turn produces a coded signal that uniquely identifies the type of the battery.

16. A battery type identification system comprising:

(a) a battery having a main body and one or more actuators formed on the main body;

(b) the one or more actuators being positioned on the main body such that the position of the one or more actuators uniquely identify the type of the battery; and (c) a battery type identification circuit for mating with one or more of the actuators on the battery and for producing a battery type output signal that is a function of the position of the one or more actuators on the battery and which identifies the type of the battery.

17. The battery identification system of claim 16 wherein the battery includes a series of spaced apart actuators that uniquely identify the type of the battery based in part at least on the spacing of the actuators.

18. The battery identification system of claim 16 wherein the battery type identification circuit includes one or more spaced apart input switches adapted to mate with one or more actuators formed on the battery.

19. The battery type identification system of claim 18 wherein the identification circuit includes a voltage divider network operatively connected to the input switches, and wherein the voltage divider network produces an output signal that is a function of the mating of one or more particular actuators with one or more particular input switches.

20. The battery type identification system of claim 19 wherein the voltage divider network includes a series of voltage divider segments with each voltage divider segment connected to a respective input switch and to an output signal line that transmits an output signal that is a function of the on/off state of the particular input switch connected to the voltage divider.

21. A battery having a main body and one or more actuators formed on the main body; and wherein the one or more actuators assume a configuration about the main body of the battery that identifies the battery as a certain type.

22. The battery of claim 21 wherein the one or more actuators includes one or more switch actuators that are operative to actuate one or more switches associated with a battery identification device.

* * * * *